US012581159B2

(12) United States Patent
Gao

(10) Patent No.: US 12,581,159 B2
(45) Date of Patent: Mar. 17, 2026

(54) METHOD AND APPARATUS FOR OPTIMIZING VIDEO PLAYBACK START, DEVICE AND STORAGE MEDIUM

(71) Applicant: BEIJING BAIDU NETCOM SCIENCE AND TECHNOLOGY CO., LTD., Beijing (CN)

(72) Inventor: Yuanfei Gao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1315 days.

(21) Appl. No.: 17/345,612

(22) Filed: Jun. 11, 2021

(65) Prior Publication Data
US 2021/0303938 A1 Sep. 30, 2021

(30) Foreign Application Priority Data

Dec. 28, 2020 (CN) .......................... 202011578020.9

(51) Int. Cl.
*H04N 21/44* (2011.01)
*G06F 18/214* (2023.01)
(Continued)

(52) U.S. Cl.
CPC ..... *H04N 21/44004* (2013.01); *G06F 18/214* (2023.01); *G06F 18/24323* (2023.01);
(Continued)

(58) Field of Classification Search
CPC ....... H04N 21/44004; H04N 21/23418; H04N 21/2401; H04N 21/4384; H04N 21/44008;
(Continued)

(56) References Cited

U.S. PATENT DOCUMENTS

| | | | | |
|---|---|---|---|---|
| 2004/0141731 A1* | 7/2004 | Ishioka | ................ | H04N 19/172 |
| | | | | 375/E7.181 |
| 2018/0376176 A1* | 12/2018 | Matsumoto | ........... | H04L 65/612 |
| 2020/0272937 A1 | 8/2020 | Jamali et al. | | |

FOREIGN PATENT DOCUMENTS

| | | |
|---|---|---|
| CN | 103475934 A | 12/2013 |
| CN | 104301786 A | 1/2015 |

(Continued)

OTHER PUBLICATIONS

Yi Sun, Improving Video Bitrate Selection and Adaption with Data-Driven Throughput Prediction, 2016, pp. 14 (Year: 2016).*

(Continued)

*Primary Examiner* — Jennifer N Welch

(74) *Attorney, Agent, or Firm* — Seed Intellectual Property Law Group LLP

(57) ABSTRACT

A method and apparatus for optimizing a video playback start, a device and a storage medium are provided. An implementation of the method may include: acquiring feature data, the acquired feature data affecting the video playback start speed when a video starts to play; inputting the acquired feature data into a pre-trained gradient boosting decision tree (GBDT) regression model to output a predicted value for a video buffer frame, and recording the predicted value as a first predicted value; and ascertaining whether to start playing the video based on the first predicted value.

20 Claims, 4 Drawing Sheets

(51) Int. Cl.

| | |
|---|---|
| *G06F 18/243* | (2023.01) |
| *G06N 20/00* | (2019.01) |
| *G06V 10/774* | (2022.01) |
| *G06V 20/40* | (2022.01) |
| *H04N 21/234* | (2011.01) |
| *H04N 21/24* | (2011.01) |

(52) U.S. Cl.
CPC ......... *G06N 20/00* (2019.01); *G06V 10/7747* (2022.01); *G06V 20/46* (2022.01); *H04N 21/23418* (2013.01); *H04N 21/2401* (2013.01)

(58) Field of Classification Search
CPC ......... H04N 21/44209; H04N 21/4662; H04N 21/8193; H04N 21/4331; H04N 21/47217; G06F 18/214; G06F 18/24323; G06N 20/00; G06N 5/01; G06N 20/20; G06V 10/7747; G06V 20/46
See application file for complete search history.

(56) References Cited

FOREIGN PATENT DOCUMENTS

| | | |
|---|---|---|
| CN | 106604079 A | 4/2017 |
| CN | 108012162 A | 5/2018 |
| CN | 109618179 A | 4/2019 |
| CN | 110209975 A | 9/2019 |
| CN | 111405327 A | 7/2020 |

OTHER PUBLICATIONS

Rana Ghani, Objective Video Streaming QoE Measurement Based on Prediction Model, 2017, pp. 6 (Year: 2017).*
Liu et al, "Developing a QoE Monitoring Approach for Video Serviec Based on Mobile Terminals", 2019 International Conference on Computing, Networking and Communications (ICNC): Internet Services and Applications, pp. 480-485.*
Yu et al, "No-refrence QoE Prediction Model for Video Streaming Service in 3G Networks", 2012 IEEE, pp. 1-4.*
Extended European Search Report for European Application No. 21183410.6, dated Nov. 18, 2021, 6 pages.
Ghani et al., "Objective Video Streaming QoE Measurement Based on Prediction Model," 2017 9th Computer Science and Electronic Engineering, IEEE, Sep. 27, 2017, pp. 201-206.
Sun et al. "CS2P: Improving Video Bitrate Selection and Adaptation with Data-Driven Throughput Prediction," SIGCOMM '16, Aug. 22-26, 2016, pp. 272-285.

* cited by examiner

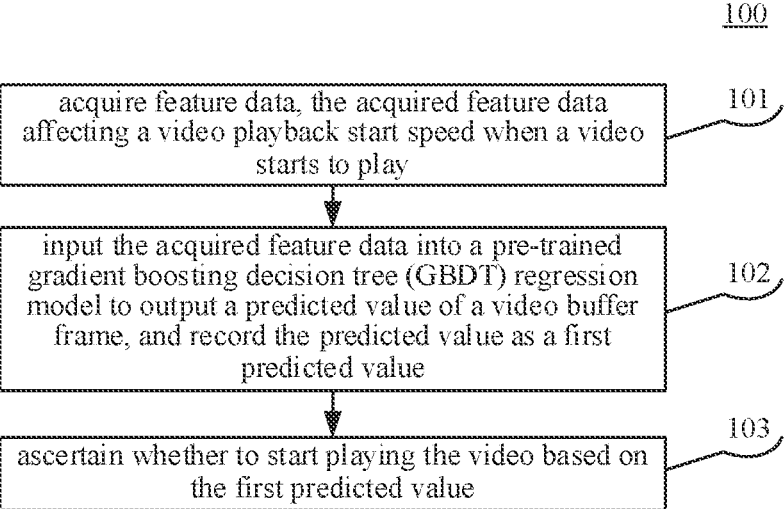

100 acquire feature data, the acquired feature data
affecting a video playback start speed when a video
starts to play

101 input the acquired feature data into a pre-trained
gradient boosting decision tree (GBDT) regression
model to output a predicted value of a video buffer
frame, and record the predicted value as a first
predicted value

102 ascertain whether to start playing the video based on
the first predicted value

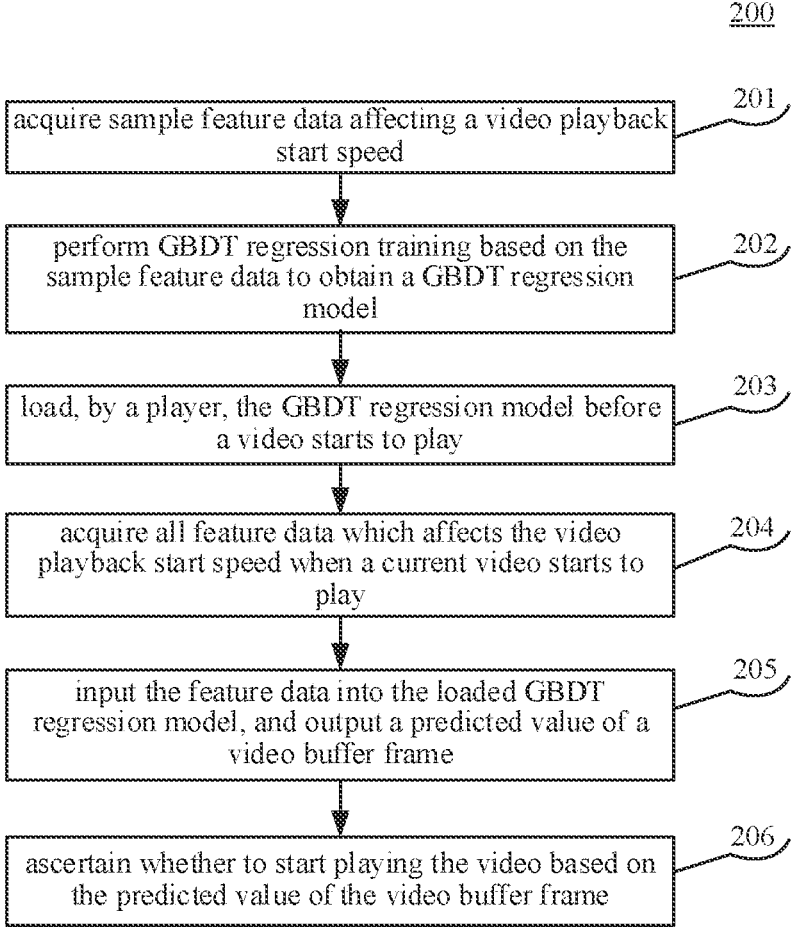

200 acquire sample feature data affecting a video playback start speed — 201 perform GBDT regression training based on the sample feature data to obtain a GBDT regression model — 202 load, by a player, the GBDT regression model before a video starts to play — 203 acquire all feature data which affects the video playback start speed when a current video starts to play — 204 input the feature data into the loaded GBDT regression model, and output a predicted value of a video buffer frame — 205 ascertain whether to start playing the video based on the predicted value of the video buffer frame — 206

Fig. 2

METHOD AND APPARATUS FOR OPTIMIZING VIDEO PLAYBACK START, DEVICE AND STORAGE MEDIUM

CROSS-REFERENCE TO RELATED APPLICATIONS

This application claims priority to Chinese Patent Application No. 202011578020.9, filed with the China National Intellectual Property Administration (CNIPA) on Dec. 18, 2020, the content of which is incorporated herein by reference in its entirety.

TECHNICAL FIELD

Embodiments of the present disclosure relate to the field of computer, particularly to the field of artificial intelligence such as deep learning and computer vision, and more particularly to a method and apparatus for optimizing a video playback start, a device and a storage medium.

BACKGROUND

With the popularization of network technology and smart devices, the number of smart terminals (e.g., mobile phones, televisions, boxes, and tablet computers) grows rapidly. It gradually becomes a habit to watch a network video and a live streaming video at anytime and anywhere. As a result, a large number of situations where the playback of the network video does not start smoothly due to various reasons occur, which brings extremely poor video playback experience to users.

Before the network video starts to play, a video player usually downloads and buffers a certain number of video frames in advance. When reaching a certain threshold value, the buffered video frames are decoded and played. The threshold value is usually selected for a certain type of scenario. Once the threshold value is selected, the threshold value is fixed. The video starts to play with the selected threshold value as a standard.

SUMMARY

Embodiments of the present disclosure proposes a method and apparatus for optimizing a video playback start, a device and a storage medium.

According to a first aspect, some embodiments of the present disclosure provide a method for optimizing a video playback start. The method includes: acquiring feature data, the acquired feature data affecting the video playback start speed when a video starts to play; inputting the acquired feature data into a pre-trained gradient boosting decision tree (GBDT) regression model to output a predicted value for a video buffer frame, and recording the predicted value as a first predicted value; and ascertaining whether to start playing the video based on the first predicted value.

According to a second aspect, some embodiments of the present disclosure provide an apparatus for optimizing a video playback start. The apparatus includes: a first acquiring module, configured to acquire feature data, the acquired feature data affecting the video playback start speed when a video starts to play; a predicting module, configured to input the acquired feature data into a pre-trained gradient boosting decision tree (GBDT) regression model to output a predicted value for a video buffer frame, and record the predicted value as a first predicted value; and an ascertaining module, configured to ascertain whether to start playing the video based on the first predicted value.

According to a third aspect, some embodiments of the present disclosure provide an electronic device. The electronic device includes: at least one processor; and a storage device, communicated with the at least one processor, where the storage device stores an instruction executable by the at least one processor, and the instruction is executed by the at least one processor, to enable the at least one processor to perform the method according to the first aspect.

According to a fourth aspect, some embodiments of the present disclosure provide a non-transitory computer readable storage medium, the non-transitory computer readable storage medium stores a computer instruction thereon, where the computer instruction, when executed by a processor, causes the processor to perform the method according to the first aspect.

According to a fifth aspect, some embodiments of the present disclosure provide a computer program product, the computer program product comprises a computer program, where the computer program, when executed by a processor, causes the processor to implement the method according to the first aspect.

BRIEF DESCRIPTION OF THE DRAWINGS

After reading detailed descriptions for non-limiting embodiments given with reference to the following accompanying drawings, other features, objectives and advantages of the present disclosure will be more apparent. The accompanying drawings are used for a better understanding of the scheme, and do not constitute a limitation to the present disclosure. Here:

FIG. 1 is a flowchart of a method for optimizing a video playback start according to an embodiment of the present disclosure;

FIG. 2 is a flowchart of a method for optimizing a video playback start according to another embodiment of the present disclosure;

DETAILED DESCRIPTION OF EMBODIMENTS

Figure 3:
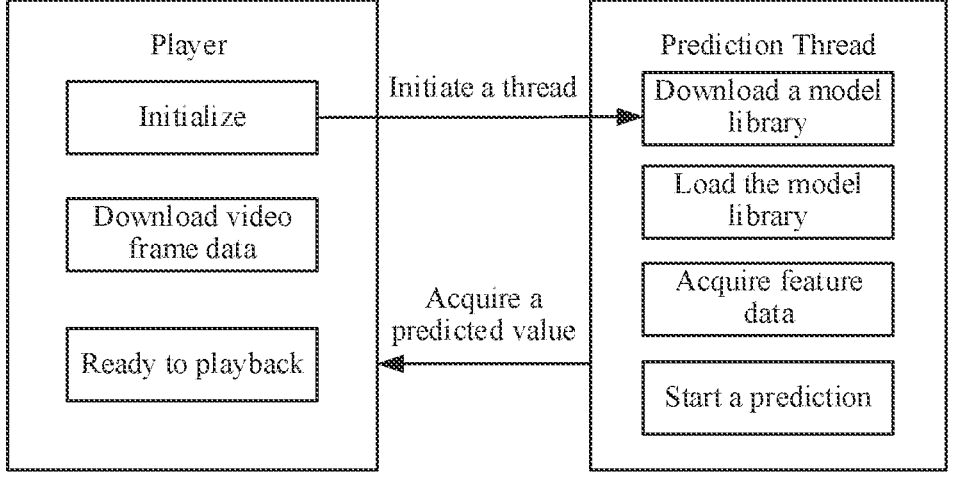
FIG. 3 is a block diagram of an implementation in which a player runs the method for optimizing a video playback start according to an embodiment of the present disclosure.

Exemplary embodiments of the present disclosure are described below in combination with the accompanying drawings, and various details of embodiments of the present disclosure are included in the description to facilitate understanding, and should be considered as exemplary only. Accordingly, it should be recognized by one of ordinary skill in the art that various changes and modifications may be made to embodiments described herein without departing from the scope and spirit of the present disclosure. Also, for clarity and conciseness, descriptions for well-known functions and structures are omitted in the following description.

It should be noted that embodiments in the present disclosure and the features in embodiments may be combined with each other on a non-conflict basis. Embodiments of the present disclosure will be described below in detail with reference to the accompanying drawings.

FIG. 1 illustrates a flow 100 of a method for optimizing a video playback start according to an embodiment of the present disclosure. The method for optimizing a video playback start includes the following steps:

Step 101, acquiring feature data, the acquired feature data affecting a video playback start speed when a video starts to play.

In this embodiment, an executing body of the method for optimizing a video playback start may acquire the feature data that affects the video playback start speed when the video starts to play. Particularly, before the first image of the video is displayed on a screen, the above executing body may acquire all feature data that affects the video playback start speed. The feature data includes, but not limited to, network type, network speed, video bit rate, video height and width, video frame rate, encoding type, decoding mode, and the like. The network type may include: local area network, wired network, wireless network, and the like. The network speed is the network speed when a current video starts to play. In some poor network scenarios, it will take a longer time to download video data including the same number of frames to reach a threshold value, resulting in a problem of deterioration of the playback start time length. The video bit rate is a number of bits of data transmitted per unit time during the data transmission. The video frame rate is a metric used to measure the number of display frames. All the above features will affect the video playback start speed when the video starts to play. Through the acquisition of all the feature data that affects the video playback start speed when the current video starts to play, the video playback start can be better optimized.

Step 102, inputting the acquired feature data into a pre-trained gradient boosting decision tree (GBDT) regression model to output a predicted value of a video buffer frame, and recording the predicted value as a first predicted value.

In this embodiment, the above executing body may input all the acquired feature data that affects the video playback start speed into the pre-trained GBDT (gradient boosting decision tree) regression model to obtain the outputted predicted value of the video buffer frame, and record the value as the first predicted value. The input of the GBDT regression model is the feature data that affects the video playback start speed, and the output of the GBDT regression model is a predicted value for the minimum number of video buffer frames. Therefore, the predicted value for the minimum number of video buffer frames in the current network situation may be obtained by inputting all the feature data that affects the video playback start speed when the current video starts to play into the above GBDT regression model, and the predicted value is recorded as the first predicted value.

In some alternative implementations of this embodiment, the pre-trained GBDT regression model is loaded before the feature data is acquired. Before the feature data affecting the video playback start speed is acquired, the GBDT regression model is loaded. After being acquired, the feature data is inputted into the GBDT regression model to obtain the predicted value.

In some alternative implementations of this embodiment, before the feature data affecting the video playback start speed when the video starts to play is acquired, the pre-trained GBDT regression model is loaded by a player before the video starts to play. During the creation of the video player, the player loads the GBDT regression model. In this way, the value for the minimum number of video buffer frames at a current situation when a video starts to play may be directly predicted when each time the player is started, thereby reducing the time length that the video takes to start playing.

Step 103, ascertaining whether to start playing the video based on the first predicted value.

In this embodiment, the above executing body ascertains whether to start playing the video based on the first predicted value. The player starts to buffer frames of a video since the video is started in the player. The number of the video frames actually buffered by the player is recorded as an actual buffer value. Therefore, after the GBDT regression model outputs the first predicted value, the player acquires the first predicted value, and compares the actual buffer value at the current time with the first predicted value, to ascertain whether to start playing the video based on the result of the comparison between the two values.

In some alternative implementations of this embodiment, the number of the video frames actually buffered by the player is compared with the first predicted value; and if the number of the video frames actually buffered by the player is greater than the first predicted value, the video frames are decoded and then displayed on the screen. The first predicted value refers to the minimum number of video buffer frames obtained based on the current network condition. The video starts to be displayed on a screen when the number of the video frames actually buffered by the player is greater than the first predicted value, and thus, the problem that the time length that the video takes to start playing degrades in different scenarios can be solved.

In some alternative implementations of this embodiment, the number of the video frames actually buffered by the player is compared with the first predicted value; and if the number of the video frames actually buffered by the player is less than the first predicted value, the player continues buffering and downloading data, and the video starts to play until the number of actually buffered video frames reaches the first predicted value, thereby reducing the number of times that the video freezes during playing.

According to the method for optimizing a video playback start provided in the embodiment of the present disclosure, the feature data affecting the video playback start speed when the video starts to play is acquired. Then, the feature data is inputted into the pre-trained GBDT regression model to output the predicted value for the video buffer frame, and the predicted value is recorded as the first predicted value. Finally, whether to start playing the video is ascertained based on the first predicted value. According to the embodiment of the present disclosure, a method of dynamically predicting an optimized number of video buffer frames through a machine learning method is provided, which reduces the time length that the video takes to start playing in various scenarios, and reduces the number of times that the video freezes during playing.

Further referring to FIG. 2, FIG. 2 illustrates a flow 200 of a method for optimizing a video playback start according to another embodiment of the present disclosure. The method for optimizing a video playback start includes the following steps:

Step 201, acquiring sample feature data affecting a video playback start speed.

In this embodiment, the above executing body may acquire feature data affecting the video playback start speed, and use the feature data as the sample feature data, for example, a network speed, round-trip time and a video bit rate. The network speed or round-trip time is acquired when video data is downloaded. The video bit rate and a format are acquired when a video frame is decoded. These feature data is uploaded to a server side when being triggered, and the server side saves these data. Accordingly, a client side may acquire and use these data to train a model.

In some alternative implementations of this embodiment, the feature affecting the video playback start speed includes at least one of: the network speed, the video bit rate, a video frame rate, a video stream format, an encoding type, a decoding mode, or the round-trip time.

Step 202, performing GBDT regression training based on the sample feature data to obtain a GBDT regression model.

In this embodiment, the above executing body inputs the acquired sample feature data into a GBDT algorithm library for iterative training until a series of parameters are adjusted to make the loss of the sample smaller as much as possible, and then obtains a model parameter to obtain a trained GBDT regression model. The GBDT regression training is a kind of supervised training performed on the model using training sample data. The training sample data includes an input and a target output. Here, the sample feature data is an input during the training, and the minimum number of video buffer frames is a target output during the training. A detailed process includes the following steps:

1) The training sample data $T=\{(x_1, y_1), (x_2, y_2) \ldots (x_m, y_m),\}$. Here, x is the sample feature data, y is the target output of the training, m is the number of pieces of sample feature data, T is the maximum number of iterations, and $L(y_i, f(x_i))$ is a loss function, $x_i$ represents an i-th training sample, $y_i$ represents a target output corresponding to the i-th training sample, and $f(x_i)$ represents a loss value of the i-th training sample. A weak learner $f_0(x)$ is initialized:

$$f_0(x) = \arg\min_c \sum_{i=1}^{m} L(y_i, c).$$

Here, c is a minimum loss value.

2) For the number of iterations t=1, 2 . . . T, a: For the i-th sample (i=1, 2 . . . m), a negative gradient $r_{ti}$ is calculated:

$$r_{ti} = -\left[\frac{\partial L(y_i, f(x_i))}{\partial f(x_i)}\right]_{f(x)=f_{t-1}(x)}.$$

b: A CART (classification and regression tree) regression tree is fitted using $(x_i, r_{ti})$ (i=1, 2 . . . m), to obtain a t-th regression tree. A leaf node region corresponding to the t-th regression tree is $R_{tj}$, j=1, 2 . . . J. Here, J is the number of leaf nodes of the regression tree t.

c: For a leaf region j=1, 2 . . . . J, an optimum fitted value $c_{tj}$ is calculated:

$$c_{tj} = \arg\min_c \sum_{x_i \in R_{tj}} L(y_i, f_{t-1}(x_i) + c).$$

d: A strong learner $f_t(x)$ is updated $$f_t(x) = f_{t-1}(x) + \sum_{j=1}^{J} c_{tj}I(x \in R_{tj}).$$

3) The expression of the strong learner $f_t(x)$ is obtained:

$$f(x) = f_T(x) = f_0(x) + \sum_{t=1}^{T}\sum_{i=1}^{J} c_{tj}I(x \in R_{tj}).$$

The trained GBDT regression model is obtained based on the above steps.

In some alternative implementations of this embodiment, the performing GBDT regression training based on the sample feature data to obtain a GBDT regression model further includes: performing data cleaning on the sample feature data, and selecting optimized sample feature data to perform the GBDT regression training to obtain the GBDT regression model. After the sample feature data is acquired, the data cleaning is further performed on the sample feature data, to filter the data with abnormal portion of features. For example, the data with null value or too large value is filtered. Meanwhile, the data causing too large freezing ratio of the video or causing too large time length that the video takes to start playing is filtered. The data cleaning performed on the sample feature data is to select the optimized feature data for the regression training, to be able to obtain the model parameter that makes the loss of the sample smaller as much as possible. Thus, the GBDT regression model is obtained.

Step 203, loading, by a player, the GBDT regression model before a video starts to play.

In this embodiment, the player loads the trained GBDT regression model before the video starts to play. For example, the player may initiate a thread to load the GBDT regression model.

In some alternative implementations of this embodiment, the player initiates a prediction thread to determine whether the player downloads the GBDT regression model. If the player has not download the GBDT regression model, the GBDT regression model is downloaded in the prediction thread. The GBDT regression model is loaded when the downloading is successful. On the one hand, the player initiates the prediction thread to determine whether the GBDT regression model is downloaded. If the GBDT regression model is not downloaded, the GBDT regression model is downloaded in the prediction thread. The GBDT regression model is loaded when the downloading is successful. On the other hand, the player starts to download video frame data after being initialized. In this way, after the prediction thread outputs a predicted value for the video buffer frame, the player may directly acquire the predicted value and ascertain whether to start playing the video based on the predicted value, thereby improving the work efficiency, reducing the time length that the video takes to start playing.

Step 204, acquiring all feature data which affects a video playback start speed when a current video starts to play.

In this embodiment, before the first image of the video appears on the screen, the above executing body may acquire all the feature data that affects the video playback start speed. The feature data includes, but not limited to, a network type, a network speed, a video bit rate, and the like.

Step 205, inputting the feature data into the loaded GBDT regression model, and outputting a predicted value for a video buffer frame by the loaded GBDT regression model.

In this embodiment, the above executing body inputs all the acquired feature data into the loaded GBDT regression model, and thus can obtain the outputted predicted value of the video buffer frame.

Step 206, ascertaining whether to start playing the video based on the predicted value of the video buffer frame.

In this embodiment, the above executing body determines whether to start playing the video based on the obtained predicted value for the video buffer frame. Particularly, the number of the video buffer frames actually buffered by the player at this time is acquired, and the number is compared with the predicted value of the video buffer frame. If the number of the actually buffered video frame is smaller than the predicted value of the video buffer frame, the buffering for the data is continued; otherwise, the video frame is decoded and then displayed on a screen.

According to the method for optimizing a video playback start provided in embodiments of the present disclosure, the sample feature data affecting the video playback start speed is first acquired. The GBDT regression training is performed based on the sample feature data to obtain the GBDT regression model. Then, the player loads the GBDT regression model before the video starts to play. All the feature data affecting the video playback start speed when the current video starts to play is acquired. Then, the above feature data is inputted into the loaded GBDT regression model, and the predicted value for the video buffer frame is outputted. Finally, whether to start playing the video is ascertained based on the predicted value of the video buffer frame. According to embodiments of the present disclosure, a method of dynamically predicting an optimized value for a video buffer frame through a machine learning method is provided, which reduces the time length that the video takes to start playing in various scenarios, and reduces the number of times that the video freezes during playing.

Further referring to FIG. 3, FIG. 3 is a block diagram of an implementation in which a player runs the method for optimizing a video playback start according to an embodiment of the present disclosure. As shown in FIG. 3, when being initiated and initialized, the player initiates a prediction thread, and the prediction thread determines whether the player downloads a GBDT regression model. If the player has downloaded the GBDT regression model, the GBDT regression model is directly loaded and feature data is acquired. If the GBDT regression model has not been downloaded, the player starts to download the GBDT regression model, and the GBDT regression model is loaded after the downloading is successful. Then, the prediction thread continues to acquire all feature data affecting the video playback start speed when a current video starts to play, and at the same time, the player downloads video frame data. The prediction thread inputs the acquired feature data into the GBDT regression model and outputs a predicted value for a video buffer frame. The player acquires the predicted value, compares the video frame data actually buffered at this time with the predicted value, and starts to play the video if the number of actually buffered video frames is greater than the predicted value. Otherwise, the player continues buffering the video frame data until the buffered video frame data reaches the predicted value. At this time, the video frames are decoded and then displayed on an screen.

Figure 4:
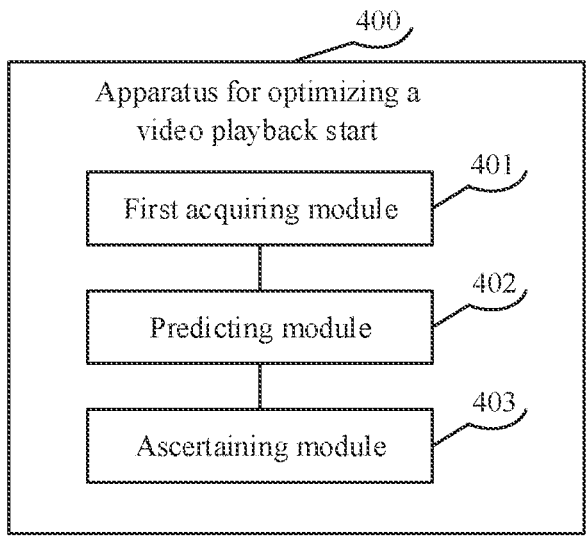
FIG. 4 is a schematic structural diagram of an apparatus for optimizing a video playback start according to an embodiment of the present disclosure.

Further referring to FIG. 4, as an implementation of the method shown in the above drawings, an embodiment of the present disclosure provides an apparatus for optimizing a video playback start. The embodiment of the apparatus corresponds to the embodiment of the method shown in FIG. 1, and the apparatus may be applied in various electronic devices.

As shown in FIG. 4, the apparatus 400 for optimizing a video playback start in this embodiment may include: a first acquiring module 401, a predicting module 402 and an ascertaining module 403. Here, the first acquiring module 401 is configured to acquire feature data, the acquired feature data affecting the video playback start speed when a video starts to play. The predicting module 402 is configured to input the acquired feature data into a pre-trained gradient boosting decision tree (GBDT) regression model to output a predicted value for a video buffer frame, and record the predicted value as a first predicted value. The ascertaining module 403 is configured to ascertain whether to start playing the video based on the first predicted value.

In this embodiment, for specific processes of the first acquiring module 401, the predicting module 402 and the ascertaining module 403 in the apparatus 400 for optimizing a video playback start, and their technical effects, reference may be respectively made to relative descriptions of steps 101-103 in the corresponding embodiment of FIG. 1, which will not be repeatedly described here.

In some alternative implementations of this embodiment, the apparatus for optimizing a video playback start further includes: a loading module, configured to load, by a player, the GBDT regression model before the video starts to play.

In some alternative implementations of this embodiment, the loading module is further configured to: initiate, by the player, a prediction thread to determine whether the player has downloaded the GBDT regression model; and download the GBDT regression model in the prediction thread in response to determining that the player has not downloaded the GBDT regression model, and load the GBDT regression model when the downloading is successful.

In some alternative implementations of this embodiment, the apparatus for optimizing a video playback start further includes: a second acquiring module, configured to acquire sample feature data affecting the video playback start speed; and a training module, configured to perform GBDT regression training based on the sample feature data to obtain the GBDT regression model.

In some alternative implementations of this embodiment, the training module is further configured to: perform data cleaning on the sample feature data, and select optimized sample feature data to perform the GBDT regression training to obtain the GBDT regression model.

In some alternative implementations of this embodiment, the feature affecting the video playback start speed includes at least one of: a network speed, a video bit rate, a video frame rate, a video stream format, an encoding type, a decoding mode, or round-trip time.

In some alternative implementations of this embodiment, the ascertaining module is further configured to: compare a number of video frames actually buffered by the player with the first predicted value; and start to play the video, in response to the number of the video frames actually buffered by the player being greater than the first predicted value.

According to an embodiment of the present disclosure, an electronic device, a readable storage medium and a computer program product are provided.

Figure 5:
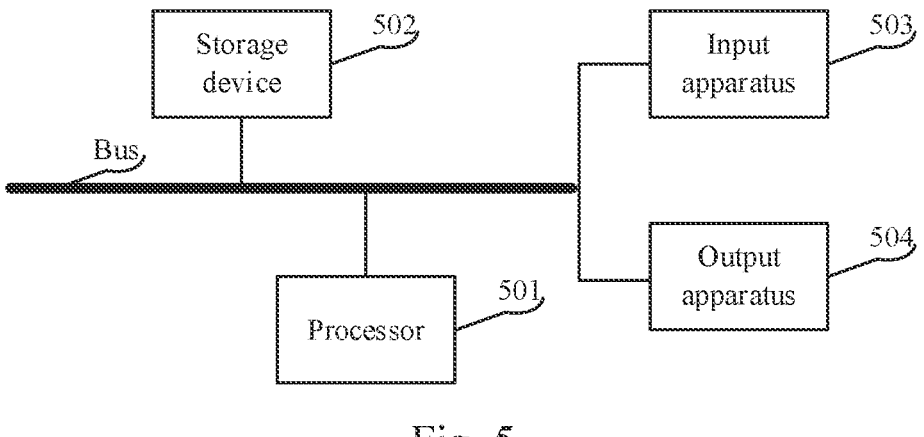
FIG. 5 is a block diagram of an electronic device used to implement a method for optimizing a video playback start according to embodiments of the present disclosure.

As shown in FIG. 5, FIG. 5 is a block diagram of an electronic device of the method for optimizing a video playback start according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 5, which is a block diagram of an electronic device of a method for optimizing a video playback start according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 5, the electronic device includes: one or more processors 501, a memory 502, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 5, one processor 501 is used as an example.

The memory 502 is a non-transitory computer readable storage medium provided by an embodiment of the present disclosure. The memory stores instructions executable by at least one processor, so that the at least one processor performs the method for optimizing a video playback start provided by embodiments of the present disclosure. The non-transitory computer readable storage medium of the present disclosure stores computer instructions for causing a computer to perform the method for optimizing a video playback start provided by embodiments of the present disclosure.

The memory 502, as a non-transitory computer readable storage medium, may be used to store non-transitory software programs, non-transitory computer executable programs and modules, such as program instructions/modules corresponding to the method for optimizing a video playback start in embodiments of the present disclosure (for example, the first acquiring module 401, the predicting module 402, and the ascertaining module 403 shown in FIG. 4). The processor 501 executes the non-transitory software programs, instructions, and modules stored in the memory 502 to execute various functional applications and data processing of the server, that is, to implement the method for ascertaining module in the foregoing method embodiments.

The memory 502 may include a storage program area and a storage data area, where the storage program area may store an operating system and at least one function required application program; and the storage data area may store data created by the use of the electronic device according to the method for ascertaining module, etc. In addition, the memory 502 may include a high-speed random access memory, and may also include a non-transitory memory, such as at least one magnetic disk storage device, a flash memory device, or other non-transitory solid-state storage devices. In some embodiments, the memory 502 may optionally include memories remotely provided with respect to the processor 501, and these remote memories may be connected to the electronic device of the method for ascertaining module through a network. Examples of the above network include but are not limited to the Internet, intranet, local area network, mobile communication network, and combinations thereof.

The electronic device of the method for processing parking may further include: an input apparatus 503 and an output apparatus 504. The processor 501, the memory 502, the input apparatus 503, and the output apparatus 504 may be connected through a bus or in other methods. In FIG. 5, connection through a bus is used as an example.

The input apparatus 503 may receive input digital or character information, and generate key signal inputs related to user settings and function control of the electronic device of the method for ascertaining module, such as touch screen, keypad, mouse, trackpad, touchpad, pointing stick, one or more mouse buttons, trackball, joystick and other input apparatuses. The output apparatus 504 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to embodiments of the present disclosure, feature data affecting the video playback start speed when a video starts to play is acquired; and then the acquired feature data is input into a pre-trained gradient boosting decision tree (GBDT) regression model to output a predicted value for a video buffer frame, and the predicted value is recorded as a first predicted value; and finally the whether to start playing the video based on the first predicted value is ascertained. Embodiments of the present disclosure provide a method of dynamically predicting an optimized value of a video buffer frame through a machine learning method is provided, which reduces the time that the video takes to start playing in various scenarios, and reduces the number of times that the video freezes when playing.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for optimizing a video playback start, comprising:

acquiring feature data, the acquired feature data affecting the video playback start speed when a video starts to play;

inputting the acquired feature data into a gradient boosting decision tree (GBDT) regression model to output a predicted value for a minimum number of video buffer frames, and recording the predicted value as a first predicted value; and

comparing a number of video frames actually buffered by a player with the first predicted value; and playing the video by the player, in response to the number of the video frames actually buffered by the player being greater than the first predicted value.

2. The method according to claim 1, wherein, before the acquiring the feature data, the method further comprises:

loading, by the player, the GBDT regression model before the video starts to play.

3. The method according to claim 2, wherein, before the loading, by the player, the GBDT regression model before the video starts to play, the method further comprises:

initiating, by the player, a prediction thread to determine whether the player has downloaded the GBDT regression model; and downloading the GBDT regression model in the prediction thread in response to determining that the player has not downloaded the GBDT regression model, and loading the GBDT regression model when the downloading is successful.

4. The method according to claim 1, wherein the GBDT regression model is obtained by:

acquiring sample feature data affecting the video playback start speed; and performing GBDT regression training based on the sample feature data to obtain the GBDT regression model.

5. The method according to claim 4, wherein the performing GBDT regression training based on the sample feature data to obtain the GBDT regression model comprises:

performing data cleaning on the sample feature data, and selecting optimized sample feature data to perform the GBDT regression training to obtain the GBDT regression model.

6. The method according to claim 5, wherein the feature data affecting the video playback start speed comprises at least one of: a network speed, a video bit rate, a video frame rate, a video stream format, an encoding type, a decoding mode, or round-trip time.

7. The method according to claim 1, wherein the feature data comprises at least one of: a network speed, a video bit rate, a video frame rate, a video stream format, an encoding type, a decoding mode, and round-trip time.

8. An electronic device, comprising:

at least one processor; and a storage device, communicated with the at least one processor, wherein the storage device stores an instruction executable by the at least one processor, and the instruction is executed by the at least one processor, to enable the at least one processor to perform operations, the operations comprising:

acquiring feature data, the acquired feature data affecting the video playback start speed when a video starts to play;

inputting the acquired feature data into a gradient boosting decision tree (GBDT) regression model to output a predicted value for a minimum number of video buffer frames, and recording the predicted value as a first predicted value; and comparing a number of video frames actually buffered by a player with the first predicted value; and playing the video by the player, in response to the number of the video frames actually buffered by the player being greater than the first predicted value.

9. The electronic device according to claim 8, wherein, before the acquiring the feature data, the operations further comprise:

loading, by the player, the GBDT regression model before the video starts to play.

10. The electronic device according to claim 9, wherein, before the loading, by the player, the GBDT regression model before the video starts to play, the operations further comprise:

initiating, by the player, a prediction thread to determine whether the player has downloaded the GBDT regression model; and downloading the GBDT regression model in the prediction thread in response to determining that the player has not downloaded the GBDT regression model, and loading the GBDT regression model when the downloading is successful.

11. The electronic device according to claim 8, wherein the GBDT regression model is obtained by:

acquiring sample feature data affecting the video playback start speed; and performing GBDT regression training based on the sample feature data to obtain the GBDT regression model.

12. The electronic device according to claim 11, wherein the performing GBDT regression training based on the sample feature data to obtain the GBDT regression model comprises:

performing data cleaning on the sample feature data, and selecting optimized sample feature data to perform the GBDT regression training to obtain the GBDT regression model.

13. The electronic device according to claim 12, wherein the feature data affecting the video playback start speed comprises at least one of: a network speed, a video bit rate, a video frame rate, a video stream format, an encoding type, a decoding mode, or round-trip time.

14. The electronic device according to claim 8, wherein the feature data comprises at least one of: a network speed, a video bit rate, a video frame rate, a video stream format, an encoding type, a decoding mode, and round-trip time.

15. A non-transitory computer readable storage medium, storing a computer instruction, wherein the computer instruction, when executed by a processor, causes the processor to perform operations, the operations comprising:

acquiring feature data, the acquired feature data affecting the video playback start speed when a video starts to play;

inputting the acquired feature data into a gradient boosting decision tree (GBDT) regression model to output a predicted value for a minimum number of video buffer frames, and recording the predicted value as a first predicted value; and comparing a number of video frames actually buffered by a player with the first predicted value; and playing the video by the player, in response to the number of the video frames actually buffered by the player being greater than the first predicted value.

16. The medium according to claim 15, wherein before the acquiring the feature data, the operations further comprise:

loading, by the player, the GBDT regression model before the video starts to play.

17. The medium according to claim 16, wherein, before the loading, by the player, the GBDT regression model before the video starts to play, the operations further comprise:

initiating, by the player, a prediction thread to determine whether the player has downloaded the GBDT regression model; and downloading the GBDT regression model in the prediction thread in response to determining that the player has not downloaded the GBDT regression model, and loading the GBDT regression model when the downloading is successful.

18. The medium according to claim 15, wherein the GBDT regression model is obtained by:

acquiring sample feature data affecting the video playback start speed; and performing GBDT regression training based on the sample feature data to obtain the GBDT regression model.

19. The medium according to claim 18, wherein the performing GBDT regression training based on the sample feature data to obtain the GBDT regression model comprises:

performing data cleaning on the sample feature data, and selecting optimized sample feature data to perform the GBDT regression training to obtain the GBDT regression model.

20. The medium according to claim 19, wherein the feature data affecting the video playback start speed comprises at least one of: a network speed, a video bit rate, a video frame rate, a video stream format, an encoding type, a decoding mode, or round-trip time.

* * * * *